United States Patent [19]

Gephart et al.

[11] 4,069,742
[45] Jan. 24, 1978

[54] POWER BRAKE BOOSTER SYSTEM

[75] Inventors: Robert L. Gephart, Spring Valley; Donald L. Parker, Middletown, both of Ohio

[73] Assignee: General Motors Corporation, Detroit, Mich.

[21] Appl. No.: 697,953

[22] Filed: June 21, 1976

[51] Int. Cl.² ........................... F01B 19/00; F15B 9/10
[52] U.S. Cl. ................................. 91/369 A; 91/369 B; 91/376 R; 91/411 A; 92/49
[58] Field of Search ............................... 92/48, 49, 50; 91/369 A, 369 B, 411 A, 369 R

[56] References Cited

U.S. PATENT DOCUMENTS

| 3,897,718 | 8/1975 | Gardner et al. | 91/376 R |
| 3,958,497 | 5/1976 | Gardner et al. | 92/48 |

Primary Examiner—Paul E. Maslousky
Attorney, Agent, or Firm—D. D. McGraw

[57] ABSTRACT

A single-piece piston in a dual diaphragm brake booster provides mounting for both diaphragms and support and guide sections for the primary and secondary piston bearings while eliminating the threaded assembly of prior two-piece pistons, or other interlocking arrangements, to make a piston assembly out of a plurality of pieces. The secondary support plate and the secondary diaphragm slip over one end of the piston without requiring piston parts to be interlocked afterward. The diaphragm seals on the outside of the piston. The primary support plate and primary diaphragm are similarly installed. The booster chamber divider and bearing are installed between the two support plate and diaphragm sub-assemblies. A reaction chamber containing reaction means is positioned radially inwardly of one guide and support section of the piston located between the two diaphragm and mounting plate means. A control valve chamber is similarly positioned radially inwardly of the other support and guide section of the piston. The chambers are separated by an apertured wall in which the air valve is reciprocably mounted, the air valve also acting to transmit force mechanically from the input push rod to the reaction means and thereafter to the output member. In one arrangement the reaction means is a reaction disc of a well-known type, and in the other arrangement the reaction means is a reaction lever system, also of a well-known type.

4 Claims, 2 Drawing Figures

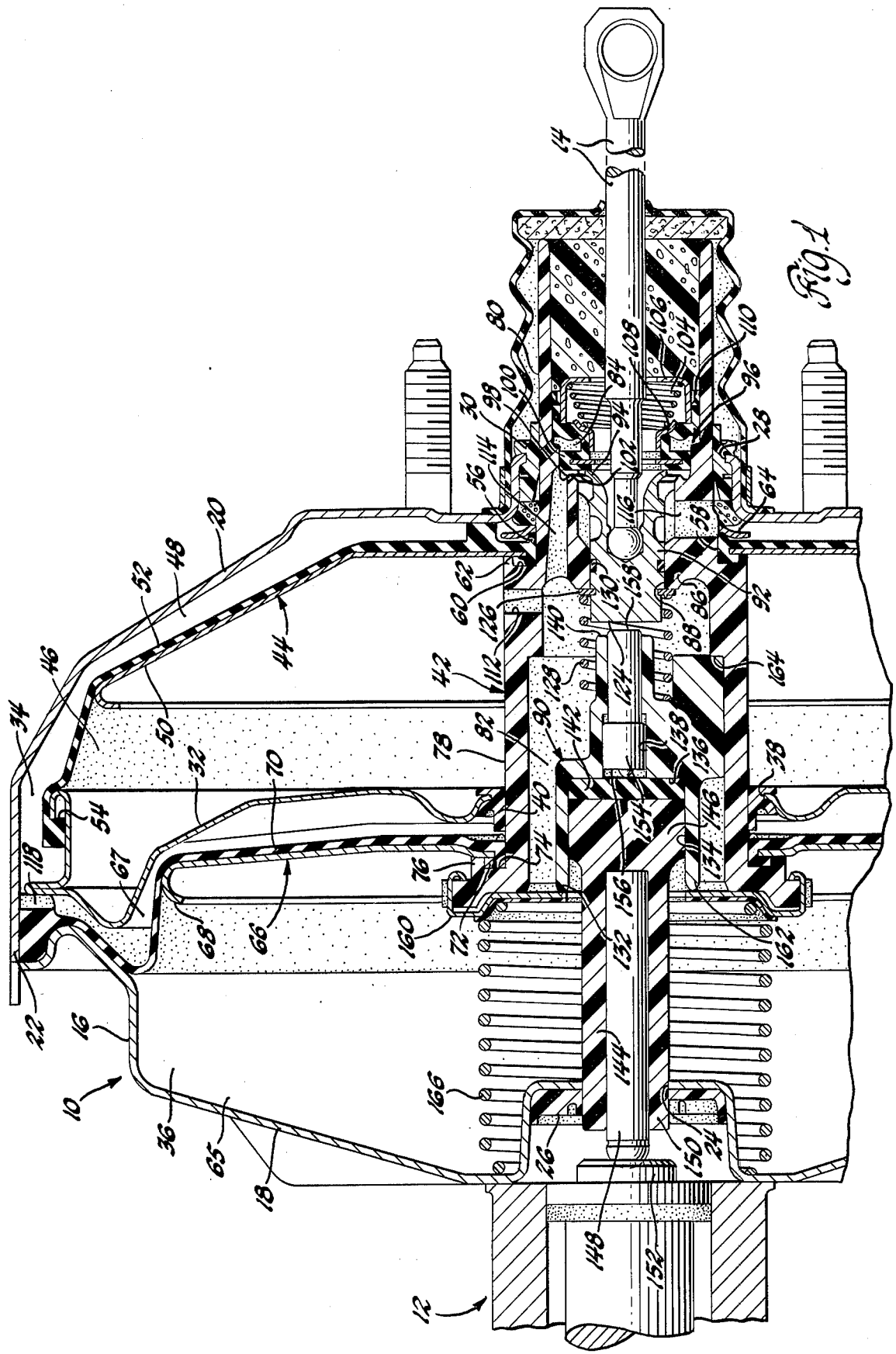

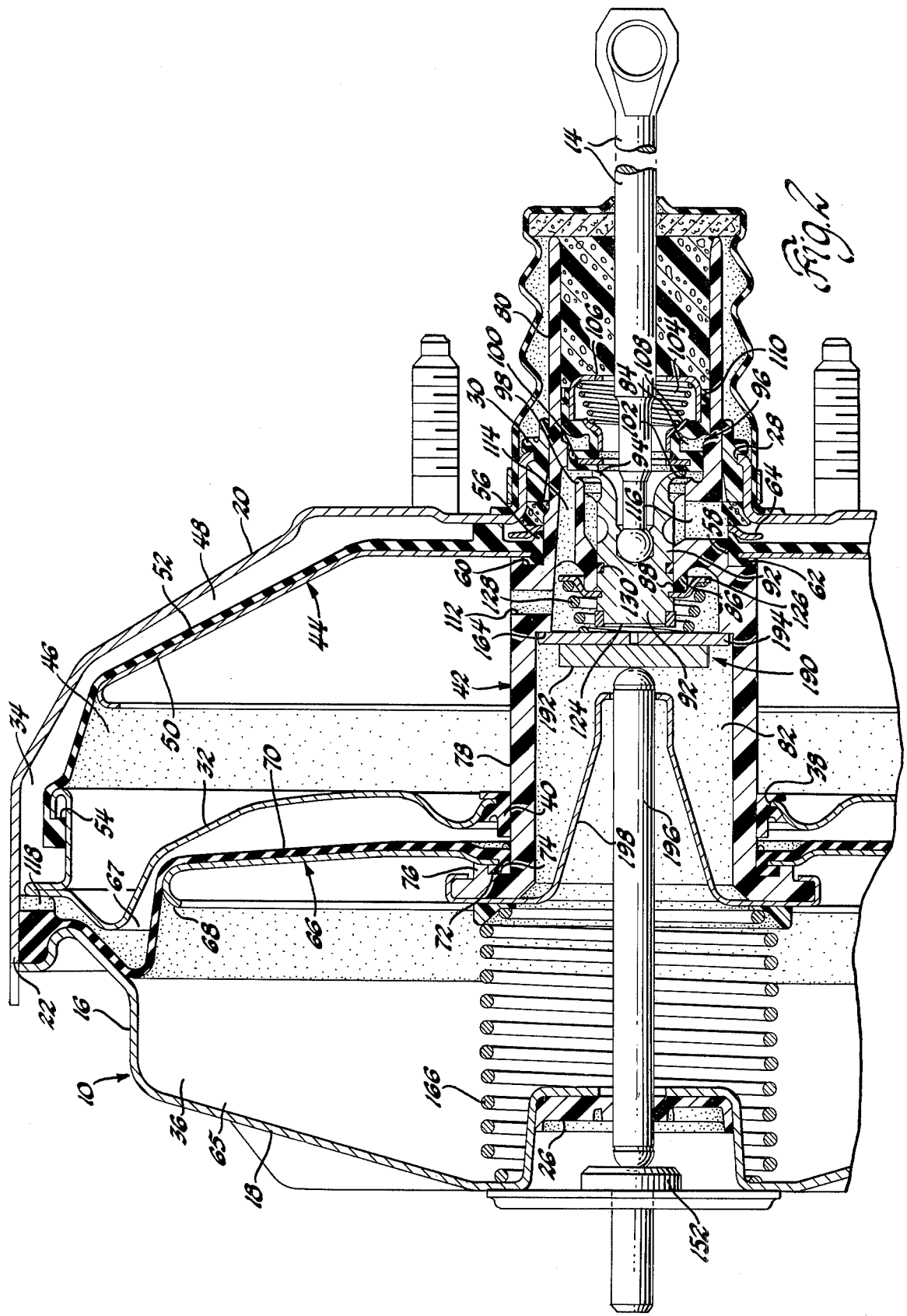

POWER BRAKE BOOSTER SYSTEM

The invention relates to a power brake booster, and more particularly to the construction of the power piston for a dual diaphragm booster arrangement.

Dual diaphragm boosters have been in use for some years and typically are constructed of a housing having a front wall and a rear wall, a housing divider and bearing dividing the housing into a front section and a rear section, and a power wall in each of the front and rear sections which divides those sections into a constant pressure chamber and a variable pressure chamber. The power walls are typically constructed of a diaphragm and a diaphragm support plate, each diaphragm having its outer periphery secured to an outer peripheral part of the housing chamber, and each diaphragm inner periphery being secured to a movable power piston. In the past power pistons have been constructed of two or more pieces, the piston sections being either interlocked in the manner similar to that disclosed in U.S. Pat. No. 3,249,021, entitled "Power Brake Booster," and issued May 3, 1966, or some other generally similar interlocking arrangements being used. It has been common to produce such boosters with the front half of the power piston being threaded into the rear half of the power piston during assembly.

The power piston embodying the invention is made of one piece, simplifying assembly and requiring less material. It is so arranged that the mounting means for the secondary power wall is at the forward end and includes the major diameter of the power piston. The mounting means for the primary power wall is at an axially intermediate part of the power piston. A support and guide section of the power piston between the two mounting means is of no greater diameter than the secondary mounting means, and is also of no lesser diameter than the primary mounting means. The rear support and guide section provided on the outer periphery of the power piston is of no greater diameter than any part of the primary mounting means. This permits assembly of the primary and secondary support plates and diaphragms without requiring the piston to be interlocked afterward. Each diaphragm seals on the outside of the piston. The booster housing divider and bearing assembly is installed between the two power walls. Due to the diametrical relationships, the assembly may be readily accomplished by sequentially inserting the piston in the various members.

It is also a feature of the power piston embodying the invention that the control valve chamber is radially inward of the rear or primary support and guide section, and a reaction means chamber is radially inward of the secondary or forward support and guide section of the piston, the two chambers being separated by an apertured wall which supports and sealingly guides the air valve. The air valve acts as a force transmitting member between the input push rod and the reaction means.

In one modification the reaction means includes a reaction body inserted and fixed in the reaction means chamber and including a reaction disc, a reaction piston, and a reaction retainer. The reaction disc type of reaction is well-known in the art and has been used in production vehicles for many years. The reaction disc is made of a rubber-like material.

Another modification uses a lever reaction system which is a typical reaction system also in production use for many years.

IN THE DRAWINGS:

FIG. 1 is a cross-section view with parts broken away and showing a power brake booster embodying the invention.

FIG. 2 is a view similar to FIG. 1 and showing a power brake booster embodying the invention and having a different reaction means.

The power booster assembly 10 is arranged to be connected to a master cylinder assembly 12 to operate the master cylinder when the power brake push rod 14 is actuated by the vehicle operator. The booster assembly 10 includes a housing 16 composed of a housing front wall 18 and a housing rear wall 20. The outer peripheries of the housing front and rear walls are suitably connected at 22. Front wall 18 is provided with an axially located aperture 24 fitted with a seal 26. Rear wall 20 is provided with an axially located aperture 28 fitted with the power piston primary bearing 30. A housing divider 32 divides the housing into a primary section 34 and a secondary section 36. Divider 32 has an axially positioned aperture 38 receiving the power piston secondary bearing 40. The power piston 42 embodying the invention is reciprocably received in bearings 30 and 40 as will be further described. The booster has a primary power wall 44 in primary section 34 and dividing the primary section into a substantially constant pressure chamber 46 and a variable pressure chamber 48. Power wall 44 includes a diaphragm support plate 50 and a diaphragm 52. The outer periphery of diaphragm 52 is secured at 54 to a part of divider 32. The inner periphery of diaphragm support plate 50 fits in a ring 56 integrally formed as a part of the inner peripheral aperture 58 of diaphragm 52. The inner peripheral edge of ring 56 fits about the outer periphery of a portion of power piston 42 and also fits within recess 60 formed in a shoulder of the power piston. This provides a mounting means 62 for the primary power wall 44. A diaphragm retainer 64 is secured to the power piston and against the diaphragm ring 56 to hold the inner periphery of power wall 44 in place in the power piston.

A secondary power wall 66 divides housing secondary section 36 into a substantially constant pressure chamber 65 and a variable pressure chamber 67.

The secondary power wall 66 is constructed with a diaphragm support plate 68 and a diaphragm 70. The outer periphery of diaphragm 70 is secured to housing 16 in the area of the juncture 22 of housing walls 18 and 20. The inner periphery of power wall 66 includes a ring 72 formed on the inner periphery of diaphragm 70 and receiving the inner periphery of support plate 68. Ring 72 is fitted within a recess 74 formed on power piston 42. The recess 74 and adjacent surfaces of the power piston define a secondary power wall mounting means 76. The power piston 42 has its forward end formed to provide mounting means 76, with the mounting means being incorporated in the largest diameter part of the power piston. The outer periphery of the power piston extending rearwardly of mounting means 76 provides a secondary support and guide section 78 which extends rearwardly to mounting means 62. The diameter of section 78 is at least as great as any portion of mounting means 62. The piston has a primary support and guide section 80 formed by the piston outer periphery rearwardly of mounting means 62 and having no diameter greater than any part of mounting means 62. In the particular construction illustrated, the surface of section 80 is slightly smaller in diameter than the portion of mounting means 62 radially inward of primary diaphragm ring 56. Primary bearing 30 slidably engages the surface of primary support and guide section 80. Secondary bearing 40 slidably engages the surface of secondary support and guide section 78. The power piston 42 is therefore reciprocably mounted in the housing 16.

A reaction means chamber 82 is provided in the forward end of the power piston 42 and radially inward the secondary support and guide section 78. A control valve chamber 84 is provided in the rear portion of power piston 42 and radially inward of the primary support and guide section 80. A wall 86 formed as a part of power piston 42 separates chambers 82 and 84. The wall is provided with an axially positioned aperture 88. Reaction means 90 of FIG. 1 is received within chamber 82.

An air valve member 92, defining a force transmitting member, is sealingly and reciprocably received in wall aperture 88. The member 92 is pivotally attached to the forward end of push rod 14 for axial movement with that rod. The rear end of the member 92 has an annular lip 94 providing the air valve which forms a part of the control valve mechanism 96. Generally radially outward of the normal location of valve 94 is an annular vacuum valve 98 formed as a part of power piston 42. A floating control valve assembly 100 is provided in chamber 84. The assembly includes a valve seat 102 which is axially engageable with air valve 94 and vacuum valve 98, a control valve spring 104, a spring retainer 106 fitted within valve seat 102, a spring seat 108 operatively secured to the inner periphery of power piston section 80, and seal 110, formed as a fixed part of the valve seat 102. The booster is shown in the released position with valve seat 102 closing air valve 94 and disengaged from vacuum valve 98. With vacuum introduced into one of the booster constant pressure chambers, and with these chambers being interconnected through reaction means chamber 82 and radially extending passage 112 of power piston 42, vacuum is also communicated through axial piston passage 114 past vacuum valve 98 and then through another piston radially extending passage 116 to the variable pressure chamber 48. Chamber 48 is connected by passage 118 in the outer periphery of diaphragm 70 to the secondary variable pressure chamber 67. It is common to connect the vacuum source with the secondary constant pressure chamber 65.

The forward end surface 124 of the force transmitting member 92 extends toward the reaction means 90. A retainer ring 126 is secured to member 92 and normally abuts wall 86 when the booster is in the released position shown. Air valve spring 128 is seated on ring 126 and also acts on a part of the reaction means 90 to continuously urge member 92 toward the released position. Seal 130 on member 92 maintains a sealed relation between chambers 82 and 84 so that when valve seat 102 engages vacuum valve 98, there is no pressure communication between chambers 82 and 84.

To this point in the description, the description applies equally to FIGS. 1 and 2. The immediately following descriptive material will apply specifically to FIG. 1. The reaction means 90 includes a reaction body 132 which seats within reaction means chamber 82. The forward end of body 132 is provided with a cavity 134 and a shoulder 136 at the rear end of the cavity. A bore 138 open through the center portion of shoulder 136 and extends rearwardly, also opening through the rear end 140 of body 132. A reaction disc 142 is received in cavity 134, with one side engaging shoulder 136 and covering the forward end of bore 138. A reaction retainer 144 has a head 146 positioned in cavity 134 and engaging the forward surface of disc 142. An output member 148 is received in retainer 144 and extends through the housing front wall 18 within a forwardly extending part 150 of retainer 144 to engage the primary piston 152 of the master cylinder 12. A reaction piston 154 is reciprocably received in bore 138 so that its forward end surface 156 is engageable with reaction disc 142. Surface 156 covers a portion of the total surface of disc 142 while shoulder 136 covers the remaining portion. The relative areas of shoulder 136 and surface 156 establish the reaction ratio. The rear end 158 of piston 154 is positioned axially adjacent and aligned with end 124 of member 92. The rear end 140 of reaction body 132 is also axially adjacent end 124 of member 92, but somewhat further spaced from that end.

A reaction body retainer 160 is connected to the forward end of power piston 42 and extends radially inward so that it axially engages the forward end 162 of body 132, tightly holding reaction body 132 in position against shoulder 164 formed within chamber 82 as a part of power piston 42. The power piston return spring 166 acts on the forward end of power piston 42 by being seated on reaction body retainer 160, and also acts on housing front wall 18. Spring 166 continuously urges the power piston 42 rightwardly to the position shown. The force of this spring is overcome as the booster mechanism is actuated to move output member 148 leftwardly.

The modification shown in FIG. 2 has a different reaction means 190 contained in reaction means chamber 82. The reaction means 190 is of the lever reaction type and includes a reaction plate 192 and reaction levers 194. The output push rod 196 engages one side of reaction plate 192 and is guided in position by push rod guide 198. The outer ends of levers 194 are pivoted on shoulder 164, and air valve spring 128 engages a center portion of levers 194. The lever inner ends are engageable with the forward end surface 124 of member 92, as is well-known in the art. The ratio between the pivot points of the levers on shoulder 164, the edges of plate 192, and the lever inner ends establishes the reaction ratio of the system.

What is claimed is:

1. In a power brake assembly having a housing, an input member, a pair of movable power walls in said housing, a control valve mechanism for selectively controlling differential air pressure acting on said power walls to operate said assembly in accordance with movement of said input member, an output member for transmitting actuating force to a master cylinder, and reaction means for transmitting a portion of the actuating force reaction to said input member:

a unitary, generally cylindrical, power piston having formed therein a control valve chamber containing said control valve mechanism and a reaction means chamber containing said reaction means, and including as integral portions thereof mounting means for said power walls and support and guide sections for supporting and guiding said piston in axial movements in said housing;

one of said mounting means for one of said power walls being at one end of the piston and of greater diameter than the other mounting means for the other of said power walls and having no part thereof, over which said one power wall must pass during assembly, of lesser diameter and axially closer to said piston one end than any other part thereof, one of said support and guide sections being axially between said one and said other mounting means and of no lesser diameter than said other mounting means, the other of said support and guide sections extending from said other mounting means axially away from said one mounting means and of lesser diameter than said other mounting means, said other mounting means having no part thereof, over which said power walls must pass during assembly, of lesser diameter and axially closer to said piston one end than any other part thereof, said control valve chamber being radially inward of said other support and guide section, said reaction means chamber being radially inward of said one support and guide means, said chambers being separated by a wall having an aperture therethrough sealingly and reciprocably receiving a force transmitting member forming a part of said control valve mechanism and mechanically operatively connecting said input member and said output member through said reaction means when said power brake assembly is actuated.

2. In a power brake assembly having a housing, an input member, a pair of movable power walls in said housing, a control valve mechanism for selectively controlling differential air pressure acting on said power walls to operate said assembly in accordance with movement of said input member, an output member for transmitting actuating force to a master cylinder, and reaction means for transmitting a portion of the actuating force reaction to said input member:

a unitary, generally cylindrical, power piston having formed therein a control valve chamber containing said control valve mechanism and a reaction means chamber containing said reaction means, and including as integral portions thereof mounting means for said power walls and support and guide sections for supporting and guiding said piston in axial movements in said housing;

said piston having one of said mounting means for one of said power walls at one end thereof, the other mounting means for the other of said power walls being at an intermediate position axially between said support and guide sections, and one of said support and guide sections being at the other end of said piston, said piston having a maximum outer diameter defined by said one mounting means and a minimum outer diameter defined by said one support and guide section, all portions of said piston located axially between and including said one mounting means and said one support and guide section having maximum and intermediate outer diameters with no such outer diameter over which either of said power walls slide during assembly being larger than any other diameter which is axially closer to said one mounting means so that power walls may be sequentially slidably received onto said piston axially from said other end of said piston toward said one mounting means during assembly;

said reaction means having a reaction body mounted in said reaction means chamber, said reaction means being of the rubber-like disc type.

3. In a power brake assembly having a housing, an input member, a pair of movable power walls in said housing, a control valve mechanism for selectively controlling differential air pressure acting on said power walls to operate said assembly in accordance with movement of said input member, an output member for transmitting actuating force to a master cylinder, and reaction means for transmitting a portion of the actuating force reaction to said input member:

a unitary, generally cylindrical, power piston having formed therein a control valve chamber containing said control valve mechanism and a reaction means chamber containing said reaction means, and including as integral portions thereof mounting means for said power walls and support and guide sections for supporting and guiding said piston in axial movements in said housing;

said piston having one of said mounting means for one of said power walls at one end thereof, the other mounting means for the other of said power walls being at an intermediate position axially between said support and guide sections, and one of said support and guide sections being at the other end of said piston, said piston having a maximum outer diameter defined by said one mounting means and a minimum outer diameter defined by said one support and guide section, all portions of said piston located axially between and including said one mounting means and said one support and guide section having maximum and intermediate outer diameters with no such outer diameter over which either of said power walls move during assembly being larger than any other outer diameter which is axially closer to said one mounting means so that said power walls may be sequentially and slippably received onto said pattern axially and in proper order from said piston other end toward said one mounting means during assembly.

4. For use in a power brake assembly having a housing with a rear wall, an input member, a pair of movable power walls in said housing with a fixed divider wall therebetween, a control valve mechanism for selectively controlling pressures acting on said power walls to operate said assembly in accordance with movements of said input member, reaction means, and an output member for transmitting actuating force to a master cylinder, the invention comprising:

a subassembly of said power brake assembly including said control valve mechanism, said reaction means and a unitary, generally tubular, power piston having as integral portions thereof a pair of mounting means for said pair of power walls and a pair of support and guide sections for supporting and guiding said piston in axial movements with respect to said housing rear wall and said divider wall, and wherein the piston has one mounting means for one of said power walls at one end thereof and another mounting means for the other of said power walls at an axially intermediate position between said support and guide sections with one of said support and guide sections being at the other piston end, said piston having a largest outer dimension defined by said one mounting means, a smallest outer dimension defined by said one support and guide section and all portions of said piston located axially between said one mounting means and said one support and guide section and over which said one power wall must pass during assembly having intermediate outer dimensions no larger than any other dimension which is axially closer to said one mounting means so that said walls may be slippingly received onto said piston sequentially in proper order and axially from said other end of said piston toward said one mounting means, said control valve mechanism including a movable valve installed in said other piston end and adapted to be connected to said input member upon final assembly of the power brake assembly, said reaction means being mounted in said piston adjacent said piston one end and adapted to be connected to said output member upon final assembly of the power brake assembly.

* * * * *

UNITED STATES PATENT OFFICE
CERTIFICATE OF CORRECTION

Patent No. 4,069,742          Dated January 24, 1978

Inventor(s) Robert L. Gephart, Donald L. Parker

It is certified that error appears in the above-identified patent and that said Letters Patent are hereby corrected as shown below:

Column 2, line 9, after "power" insert -- brake --.

Column 3, line 68, "open" should read -- opens --.

Column 5, line 60, claim 2, after "other" insert -- outer --;

line 62, claim 2, before "power" insert -- said --.

Column 6, line 36, claim 3, "pattern" should read -- piston --.

Column 7, line 2, claim 4, after "other" insert -- outer --.

Signed and Sealed this

Ninth Day of May 1978

[SEAL]

Attest:

RUTH C. MASON
Attesting Officer

LUTRELLE F. PARKER
Acting Commissioner of Patents and Trademarks